Patented Aug. 8, 1950

2,518,203

UNITED STATES PATENT OFFICE 2,518,203

METHOD OF PREPARING HALOGEN SUBSTITUTED ALIPHATIC ACID ESTERS OF CELLULOSE

Dorothy D. Thompson, Sweet Briar, Va., assignor to E. I. du Pont de Nemours & Company, Wilmington, Del., a corporation of Delaware No Drawing. Application September 12, 1946, Serial No. 696,621

16 Claims. (Cl. 260—226)

1

This invention relates to a method of preparing halogen substituted aliphatic acid esters of cellulose. More particularly, it relates to a new and improved method of preparing cellulose chloroacetate.

Halogen substituted aliphatic acid esters of cellulose, such as cellulose chloroacetate, contain reactive or functional halogen groups which, upon reaction with appropriate reagents, will form cross-linkages between the cellulose chains. In the usual method of esterifying cellulose, the latter is esterified with the acid or anhydride containing the desired acyl radical in the presence of a catalyst. However, when attempts were made to directly esterify cellulose by the use of chloroacetic acid or its anhydride, or both, in the presence of a catalyst, a highly degraded product was obtained and a negligible amount, if any, of chloroacetyl groups was introduced. Though chloroacetic acid and its anhydride do not esterify cellulose in the usual esterification processes, they have been used as impellers for the esterification of cellulose by various other acids as well as other halogenated acids, such as o-chlorobenzoic, 9,10-dibromostearic and 9,10-dichlorostearic acids.

An object of this invention is to provide a new and improved method of preparing halogen substituted aliphatic acid esters of cellulose.

Another object of this invention is to provide a method of making cellulose chloroacetate by the chloroacetylation of cellulosic ethers.

An additional object of this invention is to provide a method of making cellulose chloroacetate by the direct chloroacetylation of hydroxyethyl cellulose.

Other and additional objects of the invention will appear hereinafter.

The objects of this invention are accomplished, in general, by chloroacetylating a cellulose ether in the anhydrous gel state with chloroacetic acid or its anhydride, or both, under anhydrous conditions and in the absence of a catalyst. As will hereafter appear, the ether can be lowly etherified methyl or ethyl cellulose or hydroxyethyl cellulose.

In one embodiment of the invention, the hydroxyethyl cellulose is prepared by the reaction of alkali cellulose and ethylene oxide vapor under vacuum. To produce a hydroxyethyl cellulose having about 0.3 mol hydroxyethyl groups per glucose unit, a single 0.6 mol portion of ethylene oxide vapor is reacted with the alkali cellulose in a reaction vessel under vacuum. Higher degrees of hydroxyethyl substitution are obtained by adding 0.5 mol portions of ethylene oxide vapor to the reaction vessel under vacuum at 2 hour intervals until the desired degree of substitution is obtained. After the reaction has gone to completion, the product is dumped with stirring into hot water containing a slight excess of acetic acid and then washed on a filter or in a centrifuge until free of salts. Products containing up to about 0.3 to about 0.4 mol hydroxyethyl groups per glucose unit are washed with cold water; those containing about 0.5 mol hydroxyethyl groups per glucose unit are washed with very hot water; and those of higher substitution are neutralized and washed in ethanol-water mixtures.

The hydroxyethyl cellulose wet with water is dried by solvent interchange, and the resultant product is the anhydrous hydroxyethyl cellulose which is subjected to the chloroacetylation. The hydroxyethyl cellulose dried by solvent interchange is characterized by a soft, porous, uncollapsed state, herein called "gel," and is also anhydrous.

In other embodiments of the invention, the anhydrous gel hydroxyethyl cellulose is obtained by dissolving previously heat-dried hydroxyethyl cellulose in an appropriate aqueous sodium hydroxide solution or water, depending on the hydroxyethyl content, and drying the regenerated or precipitated hydroxyethyl cellulose by solvent interchange.

The details and manner of practicing the invention will become apparent by reference to the following specific examples, it being understood that these examples are merely illustrative embodiments of the invention and that the scope of the invention is not restricted thereto. Throughout the examples, the proportions of the ingredients are parts by weight.

Example I

Unwashed and unaged alkali cellulose (17% sodium hydroxide and 33% cellulose) prepared in the usual manner was placed in a reaction vessel under vacuum and a single 0.6 mol portion of ethylene oxide vapor introduced. Precautions were taken, as by agitation, to prevent undue matting of the product into hard lumps. The reaction was permitted to proceed at a temperature below 25° C. to produce a hydroxyethyl cellulose containing 0.3 mol hydroxyethyl groups per glucose unit, and thereafter the reaction mass was dumped with stirring into hot water containing a slight excess of acetic acid and the hydroxyethyl cellulose washed on a filter or in a centrifuge.

The hydroxyethyl cellulose was washed with cold water until free of salts and thereafter, while still wet with water, was dried by washing with about four changes of ethanol and then with benzene. In order to insure the removal of the last traces of ethanol and water, benzene was distilled from the hydroxyethyl cellulose until the proper boiling point was obtained.

The above prepared anhydrous gel hydroxyethyl cellulose containing 0.3 mol hydroxyethyl groups per glucose unit and wet with benzene was introduced into a chloroacetylating mixture consisting of chloroacetic anhydride in the proportion of 3 parts of chloroacetic anhydride to 1 part of cellulose and 20 to 25 parts of benzene per part of cellulose, and the reaction mixture heated and stirred at reflux for 24 hours.

The product, isolated by filtration and washed, with alcohol and water, until free of acid, contained 13.26% chlorine and 0.92 chloroacetyl groups per glucose unit.

Example II

Heat-dried hydroxyethyl cellulose containing 0.3 mol hydroxyethyl groups per glucose unit, prepared by the reaction of unaged alkali cellulose and ethylene oxide vapor in the known manner, was dissolved in an aqueous (6% to 7%) caustic soda solution and the hydroxyethyl cellulose regenerated therefrom in any well-known manner. The regenerated hydroxyethyl cellulose was then dried by solvent interchange, as set forth in Example I, to provide the anhydrous gel hydroxyethyl cellulose which was chloroacetylated, as set forth in Example I.

The product, isolated by filtration and washed with alcohol and water until free of acid, contained 15.46% chlorine and 1.14 chloroacetyl groups per glucose unit.

Example III

Hydroxyethyl cellulose containing 0.75 mol hydroxyethyl groups per glucose unit was prepared by the reaction of unaged alkali cellulose and ethylene oxide vapor in the usual manner. Upon the completion of the reaction, the product was dumped with stirring into 80% aqueous ethanol containing a slight excess of acetic acid and, after neutralization, was washed free of salts with ethanol-water mixtures. The hydroxyethyl cellulose wet with ethanol-water was dried by solvent interchange, as set forth in Example I.

The above prepared anhydrous gel hydroxyethyl cellulose wet with benzene was introduced into a chloroacetylating mixture consisting of 1 part of chloroacetic anhydride, 1 part of anhydrous monochloroacetic acid, and 20 to 25 parts of anhydrous benzene, the proportions being based on the cellulose. The reaction mixture was refluxed for 6 hours.

The product, isolated by filtration and washed until free of acid, contained 13.5% chlorine and 1.05 chloroacetyl groups per glucose unit.

Example IV

Heat-dried hydroxyethyl cellulose containing 1.74 mol hydroxyethyl groups per glucose unit, prepared by the reaction of unaged alkali cellulose and ethylene oxide vapor, was dissolved in water and precipitated therefrom with acetone. The resulting gel hydroxyethyl cellulose was dried by solvent interchange to benzene.

The above prepared anhydrous gel hydroxyethyl cellulose wet with benzene was introduced into a chloroacetylating bath consisting of chloroacetic anhydride in the proportion of 4 parts thereof to 1 part of cellulose and 20 to 25 parts of anhydrous benzene per part of cellulose. The reaction mixture was heated at reflux for 48 hours.

The product, isolated by filtration and washed free of acid, contained 13.6% chlorine and 1.3 chloroacetyl groups per glucose unit.

Example V 1 part of hydroxyethyl cellulose (0.28 hydroxyethyl groups per glucose unit) prepared in the usual manner but dried by solvent exchange into benzene so that it contained 1 part benzene, was suspended in a chloroacetylation bath consisting of 25 parts of anhydrous benzene, and 5 parts of anhydrous monochloroacetic acid were added. The mixture was heated and stirred at reflux temperature for 5 hours.

The white, fibrous product, isolated by filtration and washing with alcohol and water, contained 0.38 chloroacetyl groups per glucose unit. A similar reaction product obtained after 21 hours contained 0.69 chloroacetyl groups per glucose unit.

Example VI 1 part of hydroxyethyl cellulose, prepared and dried as in Example V and containing 1 part of benzene, was heated and stirred in a mixture of 4 parts of chloroacetic anhydride and 25 parts of benzene for 5 hours at reflux temperature.

The product contained 0.52 chloroacetyl groups per glucose unit. When a similar preparation was made with 2.5 parts of anhydride, the substitution was 0.25 chloroacetyl groups per glucose unit.

Example VII

Same as Example VI except that methylene chloride was substituted for the benzene in the chloroacetylating bath, and the reaction mixture was heated at reflux temperature and stirred for 24 hours.

The product contained 0.39 chloroacetyl groups per glucose unit.

In general, the degree of esterification is affected by the degree of hydroxyethyl substitution, activation treatment, proportion of reagents, time of reaction, temperature, and the inert solvent in which the reaction is effected. As shown by the examples, higher chloroacetyl substitutions are obtained by using longer reaction times, higher hydroxyethyl substitution, and a higher proportion of chloroacetylating agents. The chloroacetylating reaction is preferably carried out at a temperature between 40° and 90° C. However, higher or lower temperatures can also be used. With higher temperatures, the reaction is carried out in short periods of time. At lower temperatures, the reaction is slow and requires longer periods of time.

In carrying out the reaction, not only is the gel hydroxyethyl cellulose anhydrous, but the chloroacetylation system is formed of anhydrous components and is maintained completely anhydrous in order for the reaction to proceed. The reaction will fail to proceed properly when even traces of water are introduced into the system. To insure that the gel hydroxyethyl cellulose is anhydrous (free of water), azeotropic distillation of the last traces of water and ethanol with benzene is utilized, when the hydroxyethyl cellulose is dried by solvent exchange through ethanol to benzene.

The invention is not restricted to drying the hydroxyethyl cellulose by solvent exchange through ethanol to benzene. Solvent exchange through glacial acetic acid to benzene can also be used. Since when acetic acid is used the dryness of the system can be determined readily by the freezing point of the acetic acid washes, solvent exchange through acetic acid to benzene is preferred. Distillation of benzene from the hydroxyethyl cellulose until the proper boiling point is obtained is preferably also used to assure removal of last traces of water and acetic acid with benzene.

The product resulting from drying by solvent exchange through ethanol or acetic acid to benzene is an anhydrous gel (soft, porous, uncollapsed) hydroxyethyl cellulose wet with benzene. The quantity of benzene which wets the hydroxyethyl cellulose is not important, save that excessive amounts should be taken into consideration with respect to the quantity of benzene used as the reaction medium for the chloroacetylation. In general, hydroxyethyl cellulose containing (wetted with) 1 part, by weight, of benzene to 1 part of hydroxyethyl cellulose gives satisfactory results.

In the above examples, hydroxyethyl ethers containing 0.28, 0.30, 0.75 and 1.74 mol hydroxyethyl groups per glucose unit were utilized. The invention is not restricted to such hydroxyethyl celluloses. In general, a hydroxyethyl cellulose containing any number of hydroxyethyl groups per glucose unit can be used, and, as shown by Examples III and IV, increased degrees of hydroxyethyl groups substitution promote greater chloroacetate substitution. However, with increased hydroxyethyl content, the hydroxyethyl cellulose has greater solvent sensitivity and, because of this property, it becomes more difficult to keep it in the gel anhydrous state.

Hydroxyethyl cellulose containing more than about 0.3 to about 0.4 mol hydroxyethyl groups per glucose unit becomes very sensitive to water, and in the preparation thereof it becomes necessary to neutralize and wash it in alcohol. For the simplest type of processing, hydroxyethyl cellulose containing about 0.3 to about 0.4 mol hydroxyethyl groups per glucose unit and which is insoluble in cold water is best and, for the purpose of cross-linking reactions, such hydroxyethyl cellulose is chloroacetylated to a sufficiently high degree. Accordingly, hydroxyethyl cellulose containing about 0.3 to about 0.4 mol hydroxyethyl groups per glucose unit is preferred.

The ratio of the chloroacetic acid to the hydroxyethyl cellulose is at least 3:1, and such ratio can be as high as desired. However, in the preferred embodiment of the invention, the ratio of the chloroacetic anhydride to the hydroxyethyl cellulose is 4:1. When the acetylating mixture contains both chloroacetic anhydride and chloroacetic acid, the ratio of the chloroacetic acid to the anhydride is preferably 1:1, though it can vary within rather wide limits. Preferably, the ratio of the total quantity of the chloroacetic acid and its anhydride to the cellulose is 4:1, though lower ratios have been used successfully for the highly substituted hydroxyethyl celluloses.

The reaction is carried out preferably in benzene, which is present in the ratio of 20 to 26 parts of benzene to 1 part of the hydroxyethyl cellulose. Manifestly, a greater or lesser quantity of benzene can be utilized as desired.

The invention is not restricted to carrying out the chloroacetylation in the presence of benzene, which, however, is preferred. In general, any inert solvent which does not dissolve the ether or the chloroacetate can be used. Hydrocarbons, such as toluene, benzene and xylenes, and halogenated hydrocarbons, such as chloroform, carbon tetrachloride and ethylene dichloride, are illustrative examples of inert solvents which can be used. Aliphatic hydrocarbons also can be used, although their swelling action on the cellulose derivative is lower. Solvents which are inert toward the chloroacetylating agent but dissolve part or all of the product can be used. However, such solvents make the recovery of the product more involved and do not give a great advantage in chloroacetyl substitution. Illustrative examples of such solvents are dioxane and other ethers, and ketones. Preferably, the inert solvent in which the reaction is carried out is the last solvent employed in the solvent interchange drying operation and in which the product is insoluble.

The heterogeneous chloroacetylation is effected rapidly during the first 4 hours. Thereafter, the reaction proceeds at a slow but constant rate. Generally, the reaction will be effected within about 5 to 6 hours, though any period of time greater than this can be used provided that the selected period of reaction does not cause appreciable degradation or hydrochloric acid to split off.

The reaction is carried out, preferably, in the complete absence of a catalyst, particularly a mineral acid catalyst. When such a catalyst was utilized in the reaction, it did more harm through degradation than good in speeding up the reaction. Herein, the term "absence of catalyst" is intended to define the absence of such a quantity of catalyst as is normally used in esterifying cellulose to produce greater substitution and/or decrease the time of the reaction.

The hydroxyethyl cellulose can be prepared by any known process. Best results were obtained by preparing the hydroxyethyl cellulose in a rolled container (baratte) from unaged alkali cellulose containing 17% sodium hydroxide and 33% cellulose, and therefore this procedure of making the hydroxyethyl cellulose is preferred. Hydroxyethyl cellulose prepared from washed alkali cellulose, using a catalytic amount of alkali instead of the large amount of alkali present in standard alkali cellulose, can also be utilized, but the hydroxyethyl cellulose prepared by such procedure is less reactive toward chloroacetylation.

The anhydrous gel (soft, porous, uncollapsed) state of the hydroxyethyl cellulose makes the hydroxyethyl cellulose more reactive to chloroacetylation. As shown by the examples, the drying of the hydroxyethyl cellulose by solvent interchange appears to render the cellulose more reactive since the degree of chloroacetyl substitution is several times as high as the hydroxyethyl substitution.

The activated hydroxyethyl cellulose can be obtained in combination with the method of making the hydroxyethyl cellulose. In such method, after it is freed of salts, the water or other aqueous liquid is removed by solvent or diluent exchange. It can also be prepared from a previously dried hydroxyethyl cellulose by gelling such previously dried hydroxyethyl cellulose with alcohol-water mixtures and then drying the gel ether by solvent interchange. A previously dried hydroxyethyl cellulose can also be activated by dissolving such dried hydroxyethyl cellulose in an appropriate solvent or solvent mixture and precipitating or regenerating the hydroxyethyl cellulose from such solution, the recovered hydroxyethyl cellulose being appropriately freed of salts and dried by solvent interchange.

In general, hydroxyethyl cellulose which is dried by solvent interchange, as, for example, through ethanol or acetic acid, to benzene, can be chloroacetylated to a substitution of about two to three times the hydroxyethyl content. As shown by Example I, hydroxyethyl cellulose containing 0.3 mol hydroxyethyl groups per glucose unit can be chloroacetylated to 0.92 mol chloroacetyl groups per glucose unit, when the hydroxyethyl cellulose is dried by solvent exchange. If the washed hydroxyethyl cellulose of Example I were dried at 100° C. and then chloroacetylated as set forth in such example, the product would contain 7.52% chlorine and 0.44 chloroacetyl groups per glucose unit. By dissolving hydroxyethyl cellulose containing 0.3 mol hydroxyethyl groups per glucose unit in aqueous alkali, regenerating it and drying by solvent interchange, about 1.2 mols chloroacetyl groups per glucose unit were introduced. If the regenerated hydroxyethyl cellulose were dried by heat, the ester substitution would be about 0.3 mol per glucose unit.

Though in the preferred embodiment of the invention hydroxyethyl cellulose is chloroacetylated, the invention is not restricted thereto. The hydroxyethyl cellulose in the anhydrous gel state can be esterified with other alpha-halogen substituted aliphatic acids or their anhydrides, or both. Monochloroacetic acid, dichloroacetic acid, trichloroacetic acid, alpha-chloropropionic acid, alpha-chlorobutyric acid, the anhydrides thereof, and the corresponding bromo acids and anhydrides thereof are illustrative examples of alpha-halogen substituted aliphatic acids and anhydrides which can be used. If desired, a mixture of the alpha-halogen substituted aliphatic acid and the anhydride thereof can both be used.

In place of hydroxyethyl cellulose, other cellulose ethers, such as methyl cellulose and ethyl cellulose, can be used. When cellulose ethers of the type just mentioned are employed, such ethers are activated (converted to soft, porous, anhydrous state) by any of the procedures hereinbefore described in connection with the activation of hydroxyethyl cellulose. Lowly etherified ethyl and methyl celluloses, which are insoluble in water but soluble in aqueous alkali solutions, are preferred.

The invention provides a simple and practical method of producing an alpha-halogen substituted aliphatic acid ester of cellulose, particularly cellulose chloroacetate, by the use of the corresponding alpha-halogen substituted aliphatic acid or anhydride thereof. The absence of a catalyst in the reaction materially reduces degradation. The results obtained by the invention are amazing and indeed surprising in view of the fact that cellulose, such as cotton linters or that obtained from the regeneration from viscose, cannot be chloroacetylated directly by the use of chloroacetic acid or its anhydride, even after soaking in water for 18 hours and drying by solvent interchange through alcohol to benzene. The invention provides a method of producing a cellulose derivative containing an active halogen which can be reacted with appropriate reagents to produce new and useful compounds.

Since it is obvious that many changes and modifications can be made in the above-described details without departing from the nature and spirit of the invention, it is to be understood that the invention is not to be limited thereto except as set forth in the appended claims.

I claim:

1. A method of preparing halogen substituted aliphatic acid esters of cellulose which comprises esterifying a cellulose ether in the anhydrous gel state with an esterifying agent selected from the group which consists of alpha-halogen substituted lower aliphatic acids and anhydrides thereof under anhydrous conditions and in the absence of a catalyst, said cellulose ether being selected from the class which consists of methyl cellulose, ethyl cellulose and hydroxyethyl cellulose, the ratio of said esterifying agent to said cellulose ether being at least 3 to 1.

2. A method in accordance with claim 1 in which the said esterifying agent is chloroacetic acid and the said cellulose ether is hydroxyethyl cellulose.

3. A method in accordance with claim 1 in which the said esterifying agent is chloroacetic anhydride.

4. A method of preparing halogen substituted aliphatic acid esters of cellulose which comprises esterifying hydroxyethyl cellulose in the anhydrous gel state with an esterifying agent selected from the group which consists of alpha-halogen substituted lower aliphatic acids and anhydrides thereof under anhydrous conditions and in the absence of a catalyst, the ratio of said esterifying agent to said hydroxyethyl cellulose being at least 3 to 1.

5. A method in accordance with claim 4 in which said esterifying agent is chloroacetic anhydride and the ratio of the said anhydride to the said hydroxyethyl cellulose is 4 to 1.

6. A method of preparing halogen substituted aliphatic acid esters of cellulose which comprises esterifying hydroxyethyl cellulose containing 0.3 to 0.4 mol hydroxyethyl groups per glucose unit in the anhydrous gel state with an esterifying agent selected from the group which consists of alpha-halogen substituted lower aliphatic acids and anhydrides thereof under anhydrous conditions and in the absence of a catalyst, the ratio of said esterifying agent to said hydroxyethyl cellulose being at least 3 to 1.

7. A method in accordance with claim 6 in which said esterifying agent is chloroacetic acid.

8. A method in accordance with claim 6 in which the said esterifying agent is chloroacetic anhydride.

9. A method of preparing halogen substituted aliphatic acid esters of cellulose which comprises drying a cellulose ether wet with an aqueous medium by solvent interchange using acetic acid followed by benzene to produce an anhydrous gel, and esterifying said anhydrous gel with an esterifying agent selected from the group which consists of alpha-halogen substituted lower aliphatic acids and anhydrides thereof under anhydrous conditions and in the absence of a catalyst, said cellulose ether being selected from the class which consists of methyl cellulose, ethyl cellulose and hydroxyethyl cellulose, the ratio of said esterifying agent to the said cellulose ether being at least 3 to 1.

10. A method in accordance with claim 9 in which the said esterifying agent is chloroacetic anhydride.

11. A method in accordance with claim 9 in which the said cellulose ether is hydroxyethyl cellulose and the said esterifying agent is chloroacetic acid.

12. A method in accordance with claim 9 in which the said cellulose ether is hydroxyethyl cellulose.

13. A method of preparing halogen substituted aliphatic acid esters of cellulose which comprises drying a hydroxyethyl cellulose containing 0.3 to 0.4 mol hydroxyethyl groups per glucose unit and wet with an aqueous medium by solvent interchange using acetic acid followed by benzene to produce an anhydrous gel, and esterifying said anhydrous gel with an esterifying agent selected from the group which consists of alpha-halogen substituted lower aliphatic acids and anhydrides thereof under anhydrous conditions and in the absence of a catalyst, the ratio of said esterifying agent to the said hydroxyethyl cellulose being at least 3 to 1.

14. A method in accordance with claim 13 in which said esterifying agent is chloroacetic anhydride.

15. A method in accordance with claim 13 in which said esterifying agent is chloroacetic acid.

16. A method of preparing halogen substituted aliphatic acid esters of cellulose which comprises drying hydroxyethyl cellulose wet with an aqueous medium by solvent interchange with ethanol through benzene to produce an anhydrous gel, and esterifying said anhydrous gel with chloroacetic anhydride under anhydrous conditions and in the absence of a catalyst, the ratio of the said anhydride to the said hydroxyethyl cellulose being 4 to 1.

DOROTHY D. THOMPSON.

REFERENCES CITED

The following references are of record in the file of this patent:

UNITED STATES PATENTS

| Number | Name | Date |
|---|---|---|
| 1,613,451 | Glover | Jan. 4, 1927 |
| 1,969,468 | Malm et al. | Aug. 7, 1934 |
| 2,330,263 | Broderick | Sept. 28, 1943 |

FOREIGN PATENTS

| Number | Country | Date |
|---|---|---|
| 343,521 | Great Britain | Aug. 15, 1930 |